US008624450B2

United States Patent
Dong et al.

(10) Patent No.: US 8,624,450 B2
(45) Date of Patent: Jan. 7, 2014

(54) LINEAR VIBRATION DEVICE

(75) Inventors: Le-Ping Dong, Shenzhen (CN);
Hong-Fu Xu, Shenzhen (CN); Shi Zhou, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 216 days.

(21) Appl. No.: 13/190,445

(22) Filed: Jul. 25, 2011

(65) Prior Publication Data
US 2012/0169151 A1 Jul. 5, 2012

(30) Foreign Application Priority Data
Dec. 30, 2010 (CN) .................... 2010 2 0690431 U

(51) Int. Cl.
*H02K 5/00* (2006.01)
*H02K 33/18* (2006.01)
*H02K 33/02* (2006.01)

(52) U.S. Cl.
USPC ............ 310/25; 310/15; 310/17; 310/20; 310/21; 310/27; 310/29; 310/32; 310/36

(58) Field of Classification Search
USPC .......... 310/15, 17, 20, 21, 27, 29, 32, 36, 25, 310/12.31, 12.27
See application file for complete search history.

(56) References Cited

U.S. PATENT DOCUMENTS

| 7,671,493 | B2 * | 3/2010 | Takashima et al. | 310/15 |
| 2003/0094861 | A1 * | 5/2003 | Shimizu et al. | 310/36 |
| 2009/0096299 | A1 * | 4/2009 | Ota et al. | 310/25 |
| 2011/0115310 | A1 * | 5/2011 | Dong et al. | 310/28 |
| 2011/0115311 | A1 * | 5/2011 | Dong et al. | 310/28 |

\* cited by examiner

*Primary Examiner* — John K Kim
*Assistant Examiner* — Rohit Singh
(74) *Attorney, Agent, or Firm* — Anova Law Group, PLLC

(57) ABSTRACT

A linear vibration device is disclosed. The linear vibration device includes a housing, a plurality of elastic members received in the housing, each of the elastic member has a fastening portion connecting to the housing, an elastic arm extending from the fastening portion, and a mounting portion extending from the elastic arm, a moving unit suspended in the housing by the elastic members, a coil located below the moving unit, a supporting portion coupling to the elastic member, the supporting portion has a supporting plate covering at least a part of a top surface of the moving unit and a supporting arm extending downwardly from the supporting plate for pushing the mounting portion toward the positioning portion of the moving unit, the mounting portion has a fender defining a top part above the top surface of the moving unit for restricting the position of the supporting plate.

6 Claims, 3 Drawing Sheets

LINEAR VIBRATION DEVICE

FIELD OF THE INVENTION

The present disclosure generally relates to the art of vibration devices and, more particularly, to a linear vibrator for generating tactile sensation.

DESCRIPTION OF RELATED ARTS

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibration device. Generally, the linear vibration device comprises a cover, a base forming a receiving cavity together with the cover, a coil located on the base, an elastic member coupled to the base, a vibrating unit suspended in the receiving cavity by the elastic member. The vibrating unit typically includes a magnet and a weight attached to the magnet. The coil is positioned right below the magnet. The elastic member comprises an arm and a pair of splints extending from the arm, and the splints attach to the vibrating unit for suspend the vibrating unit in the cavity. However, during the vibration of the vibrating unit, the elastic plate can not fix with the vibrating unit in the receiving cavity firmly, which directly leads the vibrator to deteriorated endurance, and shortened lifespan.

So, it is necessary to provide a new vibrator for solving the problem mentioned above.

DETAILED DESCRIPTION OF THE EXEMPLARY EMBODIMENT

Reference will now be made to describe the exemplary embodiment in detail.

Figure 1:
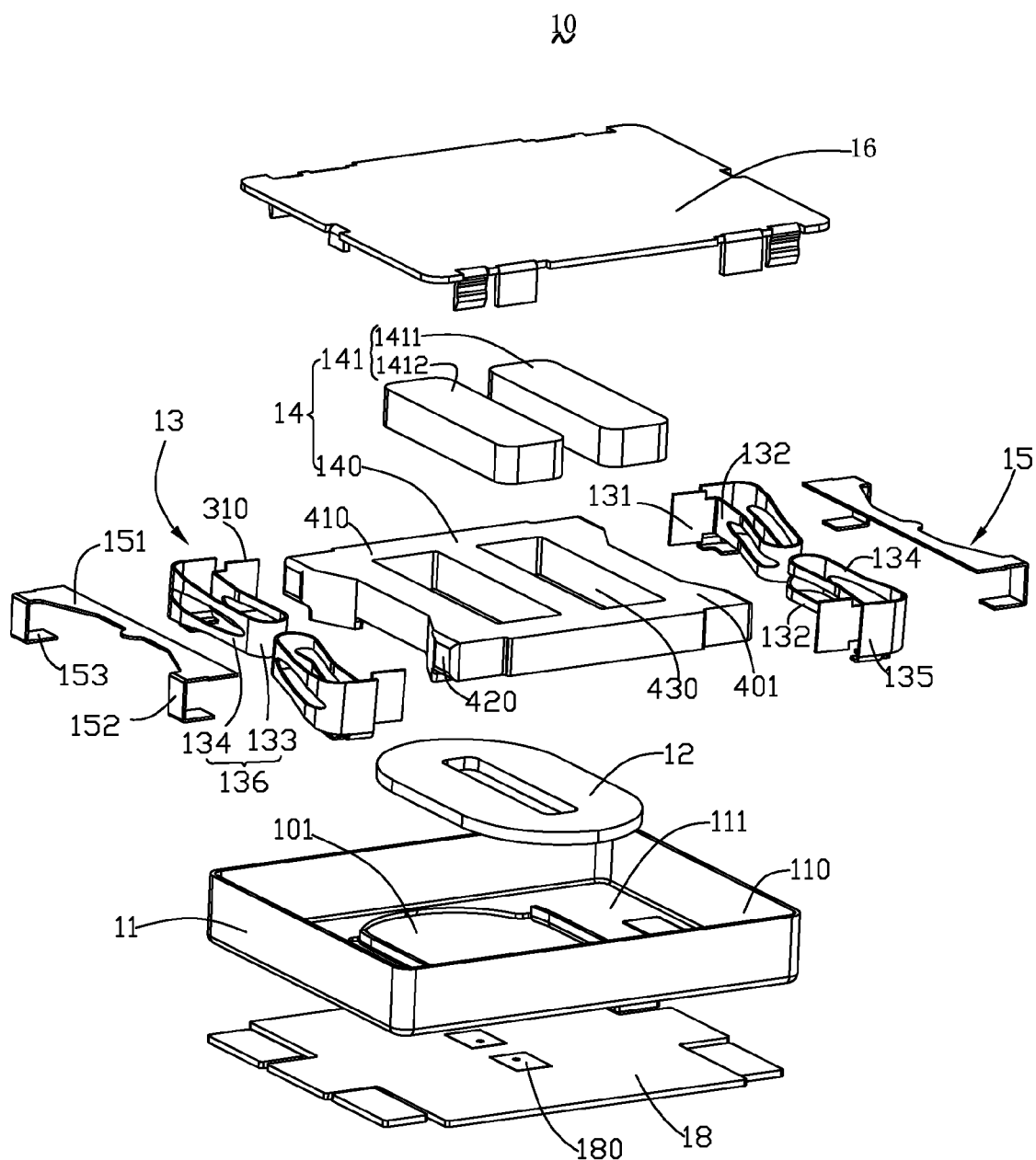
FIG. 1 is an isometric exploded view of a linear vibration device in accordance with an exemplary embodiment of the present disclosure.
Figure 2:
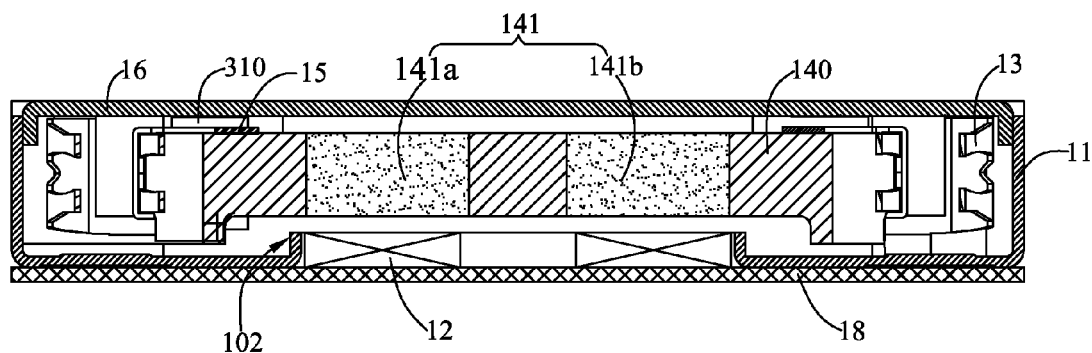
FIG. 2 is a cross-sectional view of the linear vibration device in FIG. 1.
Figure 3:
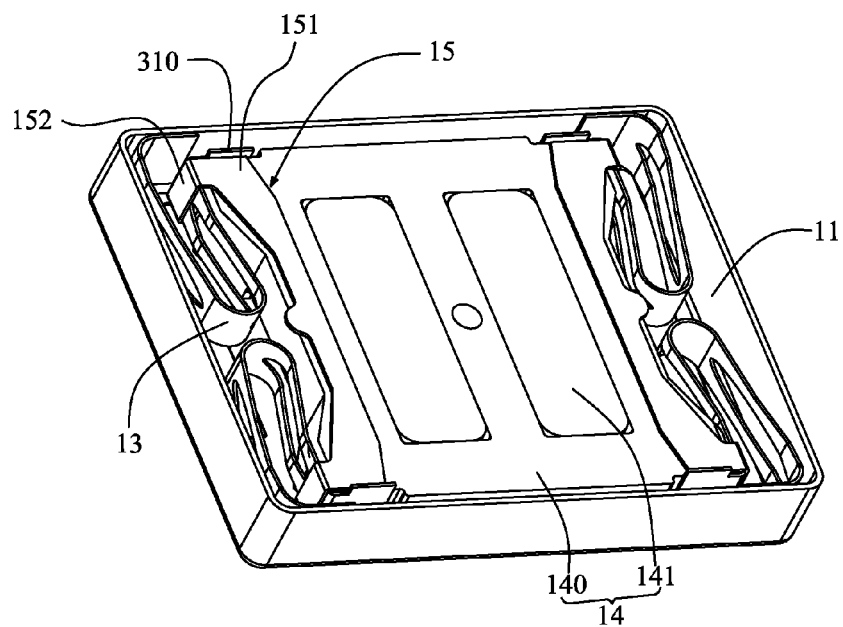
FIG. 3 is an assembled view of the linear vibration device in FIG. 1, with a cover thereof being removed.

A linear vibration device is mounted on a printed circuit board for generating tactile vibration. Referring to FIGS. 1-3, a linear vibration device 10, in accordance with an exemplary embodiment of the present invention, includes a cover 16, a crust 11 forming a receiving space together with the cover 16, a PCB (printed circuit board) 18 covered by the crust 11, an annular coil 12, a plurality of elastic member 13, a supporting portion 15, and a moving unit 14 comprising a weight 140 and a magnet assembly 141. The PCB 18 includes a plurality of welding points 180.

The cover 16 and the crust 11 corporately form a housing having the receiving space. The crust 11 further defines a bottom wall 111 and a plurality of sidewalls 110 extending perpendicularly from the bottom wall 111. The bottom wall 111 defines a though hole 101 in a middle portion thereof. The annular coil 12 electrically connects to the welding points 180 and is carried on the PCB 18 through the though hole 101. The PCB 18 is at least partially covered by the bottom wall 111.

The elastic members 13 are positioned on the crust 11, preferably on the sidewalls 110 of the crust 11. The weight 140 is suspended in the receiving space by the elastic members 13. The weight 140 includes a main body 410 and a plurality of positioning portions 401 extending from the main body 410. The positioning portions 401 are used for assembling with the elastic members 13. A protrusion 420 extending from the positioning portions 401 for coupling the elastic member 14. The main body 410 defines an aperture 430 in a middle portion thereof for receiving the magnet assembly 141 therein. The magnet assembly 141 has a first magnet part 1411 and a second magnet part 1412 separately positioned in the aperture of the weight. Thus, the magnet assembly 141, together with the weight 140, is suspended in the receiving space by the elastic members 13, i.e., the moving unit 14 is suspended in the receiving space by the elastic members 13. In fact, the magnet assembly 141 may solely be a moving unit without the weight 140, and can be directly connected to the elastic members 13. In addition, if the weight 140 is used as a part of the moving unit 14, the weight 140 can be made from materials having specific gravities higher than 7.8 g/cm$^3$.

Referring to FIG. 1, the supporting portion 15 defines a supporting plate 151, a pair of supporting arms 152 extending perpendicularly from two ends of the supporting plate 151 respectively for pushing the mounting portion 131 toward the positioning portion 401 of the moving unit 14, a supporting part 153 extending perpendicularly from the supporting arm 152 and substantially parallel to the supporting plate 151.

Figure 4:
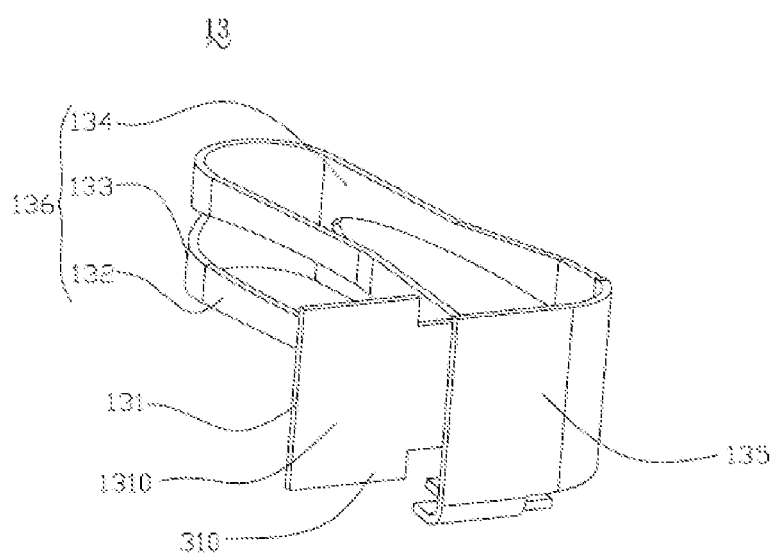
FIG. 4 is an isometric view of an elastic member of the linear vibration device in FIG. 1.

Referring to FIG. 4, each of the elastic members 13 includes a fastening portion 135 positioned on the sidewall 110 of the crust 11, an elastic arm 136, and a mounting portion 131. The elastic arm 136 comprises a first arm 134 extending perpendicularly from the fastening portion 135, a second arm 132 connected to the first arm 134 by a U-shaped connecting portion 133. The mounting portion 131 extends perpendicularly from the second arm 132 and substantially parallel to the fastening portion 135. Further, the mounting portion 131 may includes a main board 1310 and a fender 310 extending from the edge portion of the main board 1310.

Accordingly, the elastic members 13 is capable of deforming elastically along a direction substantially parallel to the fastening portion 135. The positioning portion 401 of the weight 140 is at least partially received in a slot between the supporting plate 151 and the supporting part 153, and the second arm 132 is at least partially sandwiched between the supporting arm 152 and protrusion 420. Therefore, the weight 140 is suspended in the receiving space by the elastic members 13. Accordingly, the moving unit 14 is firmly assembled to the supporting portion 15.

Referring to FIG. 2, the magnet assembly 141 has a first magnet part 141a and a second magnet part 141b, wherein, the first magnet part 141a has magnetic poles opposite to those of the second magnet part 141b. Planes of magnetic poles of the magnet assembly 141 are parallel and face to the bottom wall 111 and are also parallel to the annular coil 12.

Optionally, the crust 11 further defines a blocking ring 102 extending upwardly form a central portion of the bottom wall 111. The blocking ring 102 forming an accommodating space, for receiving the annular coil 12. The coil 12 is located right below the magnet assembly 141. The combination of the weight 140 and the magnet assembly 141 is served as a moving unit 14. The blocking ring 102 is located within the vibrating amplitude of the moving unit 14. The supporting arm 152 is attached to the second arm 132 with the second arm 132 received in the slot, and the second arm 132 is attached to an outer surface of the protrusion 420 of the weight 140. When electrified, the moving unit 14 vibrates along a direction paralleled to the PCB 18.

During the vibration of the moving unit 14, the mounting portion 131 can withstand the moving unit 14 by contacting the positioning portions 401 for limiting the vibration amplitude. Accordingly, the mounting portion 131 engages with a side surface of the positioning portion 401 of the moving unit 14. The side surface connects with and is upright to a top surface of the positioning portion 401. The supporting plate 151 overlays a part of the top surface and is vertical to the mounting portion 131. The fender 310 defines a top part above the top surface. The supporting plate 151 locates between two top parts for avoiding swaying, and the position of the supporting plate 151 is firmly restricted by the fender 310.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A linear vibration device, comprising:
   a cover;
   a crust forming a housing together with the cover, the crust defining a bottom wall and a plurality of sidewalls extending upwardly and perpendicularly from the bottom wall,
   a plurality of elastic members received in the housing, each of the elastic members including a fastening portion connecting to the housing, an elastic arm extending from the fastening portion, and a mounting portion extending from the elastic arm;
   a moving unit suspended in the housing by the elastic members, the moving unit including an aperture in a middle portion thereof for receiving a magnet assembly and a plurality of positioning portions engaging with the mounting portions of the elastic members;
   the magnet assembly accommodated in the aperture and defining a first magnet part and a second magnet part separately each other, the first magnet part having magnetic poles opposite to those of the second magnet part and planes of the magnetic poles of the magnet assembly being parallel and facing to the bottom wall of the crust;
   a PCB at least partially covered by the bottom wall of the crust;
   a coil mounted on the PCB and located below the magnet assembly;
   a supporting portion coupling to the elastic member, the supporting portion defining a supporting plate covering at least a part of a top surface of the moving unit and a supporting arm extending downwardly from the supporting plate for pushing the mounting portion toward the positioning portion of the moving unit; wherein
   the mounting portion defines a main board and a fender extending parallelly from the two ends of the main board, the fender having a top part above the top surface of the moving unit for restricting the position of the supporting plate.

2. The linear vibration device as described in claim 1, wherein the elastic arm defines a first arm extending perpendicularly from the fastening portion and a second arm connected to the first arm by a U-shaped connecting portion.

3. The linear vibration device as described in claim 1, wherein a blocking ring extends perpendicularly from a bottom wall of the housing and forms a though hole, for receiving the annular coil.

4. The linear vibration device as described in claim 1, wherein the supporting portion further defines a supporting arm extending perpendicularly from the supporting plate, a supporting part extending perpendicularly from the supporting arm and substantially parallel to the supporting plate.

5. The linear vibration device as described in claim 1, wherein the moving unit defines a weight suspending in the housing by the elastic members, the aperture in a middle portion thereof for receiving the magnet assembly.

6. The linear vibration device as described in claim 5, wherein the first magnet part and the second magnet part separately positioned in the aperture of the weight.

* * * * *